United States Patent [19]

Quakenbush et al.

[11] Patent Number: 5,763,696
[45] Date of Patent: Jun. 9, 1998

[54] REMOVAL OF DINITROTOLUENE FROM PROCESS WATER

[75] Inventors: Allen B. Quakenbush; Majid N. Keyvani; Michael C. Fullington; James L. Meyer, all of Lake Charles, La.

[73] Assignee: Arco Chemical Technology, L.P., Greenville, Del.

[21] Appl. No.: 827,326

[22] Filed: Mar. 26, 1997

Related U.S. Application Data

[60] Provisional application No. 60/015,304 Apr. 12, 1996.
[51] Int. Cl.⁶ .................................................. C07C 205/00
[52] U.S. Cl. .................................................. 568/934
[58] Field of Search ....................................... 568/934

[56] References Cited

U.S. PATENT DOCUMENTS

| | | | |
|---|---|---|---|
| 3,620,928 | 11/1971 | Miserlis | 203/78 |
| 4,236,973 | 12/1980 | Robbins | 203/10 |
| 4,261,908 | 4/1981 | Schroeder et al. | 552/254 |
| 4,344,827 | 8/1982 | Auge et al. | 203/13 |
| 5,001,272 | 3/1991 | Mason | 568/934 |
| 5,057,632 | 10/1991 | Imm et al. | 568/934 |
| 5,099,078 | 3/1992 | Quakenbusch | 568/934 |
| 5,149,890 | 9/1992 | Rauchschwalbe | 568/934 |
| 5,302,763 | 4/1994 | Quakenbush | 568/934 |
| 5,345,012 | 9/1994 | Schieb et al. | 568/934 |
| 5,354,924 | 10/1994 | Mason | 568/934 |

*Primary Examiner*—Gary Geist
*Assistant Examiner*—Jafar Parsa
*Attorney, Agent, or Firm*—Dale Lynn Carlson; Wiggin & Dana

[57] ABSTRACT

Reduction of dinitrotoluene impurity in water is achieved by distillation in the presence of nitric acid. A suitable process for such reduction comprises (a) contacting said composition with nitric acid to provide a nitric acid-containing composition, (b) distilling at least a portion of said water in said nitric acid-containing composition to provide vaporized water containing a reduced concentration of said dinitrotoluene, and (c) separating said vaporized water from said nitric acid-containing composition.

15 Claims, No Drawings

REMOVAL OF DINITROTOLUENE FROM PROCESS WATER

FIELD OF THE INVENTION

This invention relates generally to the production of dinitrotoluene. More particularly, the invention relates to an improved distillation process for removing dinitrotoluene impurity from process effluent water.

BACKGROUND OF THE INVENTION

Dinitrotoluene (DNT) is a versatile and valuable chemical intermediate which is widely used in the production of toluene diisocyanate. However, if it is allowed to flow uncontrolled in the environment, for example if present as an impurity in a stream or pond, it may pose a potential pollution problem and a hazard to aquatic life.

DNT is produced by a process involving the nitration of toluene first to mononitrotoluene and then to DNT. Historically, the nitration reaction has been carried out commercially using a mixed acid system, namely, nitric acid and sulfuric acid. However, as a result of recent developments in this field, an alternative, improved process is now available for the commercial production of DNT which, among other things, obviates the need for using sulfuric acid in the nitration of toluene. See for example U.S. Pat. No. 5,001,272, issued Mar. 24, 1991 to Mason and U.S. Pat. No. 5,009,078, issued Mar. 24, 1992 to Quakenbush.

The nitration reaction, whether using a mixed acid system or nitric acid by itself, results in the generation of a substantial amount of water, i.e., water produced as a by-product of the nitration reaction, water contained in the nitric acid feed stock and water used throughout the production process for various utility functions. All this water, which is often referred to as the "process effluent water" or simply "process water" is collected and ultimately discharged as a process effluent stream. However, before being discharged, the process water must be treated to remove objectionable impurities and thereby meet environmentally acceptable standards or permitted discharge requirements. For a variety of practical reasons, distillation is often considered to be the most efficient and cost-effective purification operation.

However, it has been found that DNT process effluent water contains dissolved DNT in concentrations which, although relatively low, could pose a pollution or environmental problem. Accordingly, this invention is directed to a relatively simple and economically attractive improvement for solving this problem. And in a broader sense; the invention provides an improved process for substantially reducing the DNT concentration in any aqueous medium or stream containing DNT as an impurity.

SUMMARY OF THE INVENTION

In accordance with the invention, a process has been found for substantially reducing the concentration of DNT in water containing such DNT as an impurity, which comprises distilling off the water in the presence of nitric acid. Further according to the invention, an improved distillation process is provided whereby process effluent water generated in the production of DNT can be separated in suitable condition for biological treatment and proper disposal.

In one aspect, the present invention relates to a process for reducing the concentration of dinitrotoluene in water containing said dinitrotoluene as an impurity, which process comprises distilling the water in the presence of nitric acid.

In another aspect, the present invention relates to a process for reducing the concentration of dinitrotoluene in water in a composition containing said dinitrotoluene and said water which comprises distilling at least a portion of said water in said composition in the presence of nitric acid to provide vaporized water containing a reduced concentration of said dinitrotoluene.

In yet another aspect, the present invention relates to a process for reducing the concentration of dinitrotoluene from a composition containing said dinitrotoluene and said water which comprises:

(a) contacting said composition with nitric acid to provide a nitric acid-containing composition, and (b) distilling at least a portion of said water in said nitric acid-containing composition to provide vaporized water containing a reduced concentration of said dinitrotoluene, and (c) separating said vaporized water from said nitric acid-containing composition.

DETAILED DESCRIPTION OF THE INVENTION

The invention is based on two discoveries relating to the separation and removal of process water which is generated during the production of DNT. The first discovery is that when contained in water in low concentrations, DNT has a volatility which is close to, and in the case of the 2,6-isomer, higher than, the volatility of water. Consequently, when such water is removed as a vapor phase, i.e., by distillation, a substantial proportion of the DNT will ordinarily evaporate or distill off with it; so that when the water subsequently is recondensed for ultimate disposal, it may well contain an environmentally objectionable level of DNT.

The second discovery is that the volatility of DNT, when contained in water in low concentrations, can be reduced by the addition of nitric acid. In accordance with the invention, this discovery not only provides the means for separating and removing process water which is substantially free of DNT, but also enables the achievement of this objective in a simple and cost efficient way. Thus no extra steps are required, the need for elaborate purification equipment is eliminated and the nitric acid employed in carrying out the distillation is the very acid used in the nitration reaction. As such it is easily and conveniently recycled to the nitration reactor either directly or after undergoing concentration, if necessary.

The process of the invention can be advantageously used to treat any aqueous medium or stream containing dinitrotoluene in a concentration which cannot be readily removed by phase separation. It is of course well-known that dinitrotoluene has limited solubility in water. That is to say, it ordinarily will dissolve in water but only up to a limited concentration level. This concentration level limit, technically known or referred to as the saturation point, varies depending on the DNT isomer mix and also depending on temperature and other physical or chemical conditions. For example, while under normal conditions the saturation point may range up to about 1,200 parts per million by weight (ppm), if a substantial amount of nitric acid is present, it would raise the saturation point dramatically. If more than the saturation level is present in the water, it will phase separate, and as such it will be easy to remove. Removing the dissolved DNT, however, is another matter; and removed (or substantially reduced) it must be, before the water containing it can be responsibly disposed of without creating a hazard to the environment.

In view of the foregoing discussion, it will become readily apparent that the process of the invention can be used to reduce the level of DNT present in any concentration, and any isomer mix, in water. Accordingly, the term "impurity", as used herein with reference to the presence of DNT in the process water, is intended to mean and include any concentration which will result in some DNT being dissolved in the water. Regarding the isomer mix, it is to be noted that the 2,4 -isomer differs from the 2,6 -isomer in that its volatility (when present in relatively low concentrations in water) remains above, although quite close to, the volatility of water. Nevertheless, using the improvement disclosed herein will facilitate the removal or adreduction of the 2,4 -isomer as well the 2,6 - and other isomers inasmuch as the presence of the nitric acid will enhance the effectiveness of the distillation. In general, the process of the invention is particularly suited for water containing dissolved therein either the 2,6 -isomer alone or a mixture thereof with other DNT isomers. And to the extent, as noted earlier, that any DNT present over and above the saturation point can ordinarily be removed by simple phase separation, the process of the invention is especially adapted for distilling water containing DNT as an impurity in a concentration up to about the saturation point.

As noted above, a critical parameter in practicing the distillation process of the invention is to effect this operation in the presence of nitric acid. Some further scientific evidence has been developed to suggest that an alternative source of nitrate ions, other than nitric acid, may also be effective. For example, it has been found, in accordance with the invention, that the addition of an alkaline earth metal salt, specifically magnesium nitrate, in lieu of the nitric acid, has essentially a similar effect in lowering the volatility of DNT isomers. Based on this further finding, it is contemplated that various other sources of nitrate ions, including selected other nitrate salts, may be employed to achieve the same result or phenomenon as is achieved with the use of nitric acid. Nevertheless, the detailed description provided herein will focus on nitric acid, inasmuch as its use is preferred for a variety of practical reasons.

The nitric acid, in any suitable concentration is added to the water before or during the distillation operation. It has been found, moreover, that there is an inverse relationship between the concentration of nitric acid present and the concentration of DNT in the overhead water. That is to say, within certain limits, the greater the concentration of nitric acid in the water being distilled, the lower the concentration of DNT in that water after distillation. Thus in accordance with the invention, although any concentration of acid may be used, it is preferable to employ such amounts of nitric acid as to provide an acid concentration in the water of at least about 10 percent by weight and more preferably from about 15 to about the azeotropic concentration of nitric acid in water, i.e., normally about 70 percent by weight. The most preferred acid concentration range is from about 25 to about 60 percent by weight.

In practicing the invention, the necessary amount of acid which is calculated to provide the desired concentration is simply added to the water either before commencement of the distillation operation or shortly thereafter. A further alternative, which would be particularly suited for continuous operation in a packed distillation column, is to inject the acid at a point above the water level so that, as it enters the column, it will come in contact with the rising vapors. In accordance with yet another embodiment, the desired acid concentration is achieved by both including some acid in the water entering the column and injecting more acid into the column at a point above the water level as mentioned above.

The distillation can be carried out using any suitable or conventional apparatus or equipment ranging from a simple flash still to a fractional distillation column, which can be single-stage or multi-stage, with trays, packing or other mass transfer devices. Multi-stage distillation is preferred, particularly when the objective is to achieve a reduction of DNT concentration to less than about 100 ppm. Thus in accordance with the most preferred emoivments of the invention, DNT concentrations of below about 60 ppm by weight, and even below about 50 ppm (e.g., between 25 and 45 ppm) are achieved using multi-stage distillation.

The distillation is performed at any suitable temperature. Obviously, the actual boiling temperature of water will depend on the concentration of the nitric acid therein, and it is also governed by, and is a function of, the distillation pressure. As for the latter, it may range from as low as about 25 mm. of mercury to about 40 psia, with a preferred range of from about 150 mm. of mercury to about 25 psia.

The process of the invention may be carried out batchwise or as a continuous operation, the latter being preferred. In batch operation, the distillation can proceed, if desired, until azeotropic conditions are attained, i.e., until sufficient water has been evaporated so that the concentration of the acid in the remaining water reaches or approaches the azeotropic concentration. At this point, the distillation is stopped and the purified overhead water is taken out for further processing or biotreatment, as required, before it is properly discharged. In continuous operation, the water to be distilled is continuously fed to the distillation column at a rate which approximately equals the combined rate of bottoms and overheads coming out of the column. The water entering the column may already contain the desired concentration of nitric acid in it, or, alternatively, the acid may be injected into the column as a separate stream. As noted earlier, a further alternative which, in accordance with one embodiment is preferred, is to provide for the presence of nitric acid in two ways by (a) adding some acid to the water entering the distillation column (for example such as to provide an acid concentration from about 5 to about 25 percent by weight), and (b) injecting further amounts of acid into the column, preferably at a point where it will come in contact with the rising vapor. The distillation column bottoms (whether resulting from a batch or continuous operation), containing higher concentrations of both nitric acid and DNT, can be recycled as such to the toluene nitration reactor or, depending on the desired acid concentration in the recycle stream and/or in the reactor, the bottoms may first be concentrated before being recycled to the reactor.

The following examples are provided merely to illustrate the invention. All parts and percentages are by weight unless otherwise specified.

EXAMPLE 1

In this example, a simple flash still is used to demonstrate the effect of nitric acid when water containing 2,6-DNT as an impurity is boiled. A water stream containing 2,6-DNT in a concentration of 0.0099 mole percent (based on the combined moles of water and DNT) is fed continuously to a simple, flash still, with nitric acid being continuously injected into the stream at a rate sufficient to provide an acid concentration in the stream of approximately 20 percent. After a 50% molar proportion of the stream has boiled overhead, the DNT concentration is checked in both the bottoms liquid stream and in the overhead stream using gas chromatography. The overhead stream contained 0.0083 mole percent of 2,6-DNT; whereas, the bottoms stream contained 0.0102 mole percent. For comparison purposes, the same run was repeated, but this time no nitric acid was used. As a result, the overhead stream contained 0.0119 mole percent of 2,6-DNT, while the bottoms contained 0.0079 mole percent.

EXAMPLE 2

In this example, a distillation column is used consisting of a lower section housing a boiling still and an upper section containing a series of distillation trays for enhanced vapor-liquid contact. In a continuous operation, an aqueous solution containing 5,000 ppm of DNT and 14% nitric acid is fed to the column at the rate of 4.5 grams per minute. The DNT is a typical isomer blend, as used commercially in making toluene diisocyanate. It consists approximately of 76 percent of the 2,4 isomer, 19 percent of the 2,6 - isomer and about 5 percent of other minor isomers. Approximately 3.5 grams per minute are taken out as bottoms and one gram per minute as an overhead stream. Using gas chromatography, the overhead stream is found to contains 470 ppm of DNT.

EXAMPLE 3

In this example, the identical procedure of Example 2 is followed, except that in addition to the 14% acid concentration in the water, more acid is added. Specifically, a 70% solution of nitric acid is injected at the rate of 3.5 grams per minute, this acid solution entering the column at the top of the trayed section, thereby coming in contact with the rising vapors. The overhead stream is found to contain only 40 ppm of DNT.

While the invention has been described above with references to specific embodiments thereof, it is apparent that many changes, modifications and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A process for reducing the concentration of dinitrotoluene from a composition containing said dinitrotoluene and said water which comprises:
   (a) contacting said composition with nitric acid to provide a nitric acid-containing composition, and
   (b) distilling at least a portion of said water in said nitric acid-containing composition to provide vaporized water containing a reduced concentration of said dinitrotoluene, and
   (c) separating said vaporized water from said nitric acid-containing composition, wherein said nitric acid is present in a concentration of at least about 10 percent by weight, based upon the weight of said composition.

2. A process for reducing the concentration of dinitrotoluene in water containing said dinitrotoluene as an impurity, which process comprises distilling the water in the presence of nitric acid, wherein said nitric acid is present in a concentration of at least about 10 percent by weight.

3. The process of claim 2 wherein said dinitrotoluene is comprised of the 2,6 -isomer alone or in combination with other isomers.

4. The process of claim 3 wherein said nitric acid concentration ranges from about 15 percent by weight to about an azeotropic concentration of said nitric acid in said water.

5. The process of claim 4 wherein the distilling is carried out in a column having a lower section into which said water is fed and an upper section from which the water vapor, containing a substantially reduced concentration of said dinitrotoluene, is removed.

6. The process of claim 5 wherein said acid concentration ranges from about 25 to about 60 percent by weight.

7. The process of claim 6 wherein nitric acid is injected into said upper section of the distillation column such as to come in contact with said water vapor.

8. The process of claim 7 in which the feed water to the distillation column contains from about 5 to about 25 percent by weight of nitric acid.

9. A process for reducing the concentration of dinitrotoluene in water in a composition containing said dinitrotoluene and said water which comprises distilling at least a portion of said water in said composition in the presence of nitric acid to provide vaporized water containing a reduced concentration of said dinitrotoluene, wherein said nitric acid is present in an amount of between about 10 percent and about 70 percent by weight based upon the weight of said composition.

10. The process of claim 1 wherein said dinitrotoluene is comprised of the 2,6 -isomer alone or in combination with other isomers.

11. The process of claim 10 wherein said nitric acid concentration ranges between about 15 percent by weight and about 70 percent by weight of said nitric acid, based upon the weight of said composition.

12. The process of claim 11 wherein the distilling is carried out in a column having a lower section into which said water is fed and an upper section from which the water vapor, containing a substantially reduced concentration of said dinitrotoluene, is removed.

13. The process of claim 12 wherein said acid concentration ranges from about 25 to about 60 percent by weight, based on the weight of said composition.

14. The process of claim 13 wherein nitric acid is injected into said upper section of the distillation column such as to come in contact with said water vapor.

15. The process of claim 14 in which the feed water to the distillation column contains from about 5 to about 25 percent by weight of nitric acid.

* * * * *